United States Patent
Lowry et al.

(10) Patent No.: US 10,078,968 B2
(45) Date of Patent: Sep. 18, 2018

(54) SYSTEM AND METHOD FOR ELECTRONIC TEST DELIVERY

(71) Applicant: Law School Admission Council, Inc., Newtown, PA (US)

(72) Inventors: Troy William Lowry, Barto, PA (US); Hao Wang, Newtown, PA (US); Carl Richard Sulzer, Churchville, PA (US)

(73) Assignee: Law School Admission Council, Inc., Newtown, PA (US)

(*) Notice: Subject to any disclaimer, the term of this patent is extended or adjusted under 35 U.S.C. 154(b) by 207 days.

(21) Appl. No.: 13/720,149

(22) Filed: Dec. 19, 2012

(65) Prior Publication Data
US 2014/0170627 A1    Jun. 19, 2014

(51) Int. Cl.
G09B 7/06    (2006.01)
G09B 7/07    (2006.01)

(52) U.S. Cl.
CPC .................. G09B 7/06 (2013.01); G09B 7/07 (2013.01)

(58) Field of Classification Search
CPC .................................. G09B 7/07; G09B 7/073
USPC ........................................................ 434/351
See application file for complete search history.

(56) References Cited

U.S. PATENT DOCUMENTS

| | | | |
|---|---|---|---|
| 4,405,829 A * | 9/1983 | Rivest | H04L 9/302 380/255 |
| 7,391,865 B2 * | 6/2008 | Orsini et al. | 380/201 |
| 7,421,074 B2 * | 9/2008 | Jin | G06F 7/723 380/255 |
| 8,064,817 B1 * | 11/2011 | Ziv-El | 434/319 |
| 2003/0012372 A1 * | 1/2003 | Cheng | H03M 13/2957 380/28 |
| 2003/0162156 A1 | 8/2003 | Poreh | |
| 2004/0091847 A1 * | 5/2004 | Creamer | G09B 7/02 434/353 |
| 2004/0148350 A1 | 7/2004 | Lacy | |
| 2005/0021519 A1 | 1/2005 | Ghouri | |

(Continued)

FOREIGN PATENT DOCUMENTS

| CN | 1672159 | 9/2005 |
|---|---|---|
| CN | 101902963 | 12/2010 |

OTHER PUBLICATIONS

ExamSoft Worldwide, Inc., http://learn.examsoft.com, 32 pages, downloaded Feb. 5, 2013.

(Continued)

*Primary Examiner* — Sam Yao
*Assistant Examiner* — Michael Humphrey
(74) *Attorney, Agent, or Firm* — Morgan Lewis & Bockius LLP

(57) ABSTRACT

Systems and methods for electronic test delivery are described herein. A host computer is in electronic communication with one or more devices over a wireless private network. The host computer is configured to transmit data describing a plurality of test unit components to at least one of the devices. Each of the devices is configured to request from the host computer certain of the data describing the plurality of test unit components that form a test unit, receive the certain data, assemble the certain data, and display the assembled certain data as the test unit. The host computer is further configured to receive data describing one or more responses associated with the test unit from at least one of the devices.

20 Claims, 6 Drawing Sheets

(56) References Cited

U.S. PATENT DOCUMENTS

| | | | |
|---|---|---|---|
| 2005/0078821 A1* | 4/2005 | Jin | G06F 7/723 380/46 |
| 2006/0088811 A1 | 4/2006 | Park et al. | |
| 2006/0294216 A1* | 12/2006 | Swanson et al. | 709/223 |
| 2007/0172808 A1 | 7/2007 | Capone | |
| 2010/0077337 A1 | 3/2010 | Yang et al. | |
| 2010/0151431 A1* | 6/2010 | Miller | 434/350 |
| 2010/0255448 A1 | 10/2010 | Maki et al. | |
| 2010/0281287 A1* | 11/2010 | Doerksen et al. | 713/340 |
| 2010/0318797 A1 | 12/2010 | King et al. | |
| 2012/0045745 A1* | 2/2012 | Lee et al. | 434/351 |
| 2012/0079100 A1 | 3/2012 | McIntyre et al. | |
| 2012/0250682 A1* | 10/2012 | Vincent et al. | 370/390 |
| 2012/0264101 A1 | 10/2012 | Krohner et al. | |
| 2013/0103519 A1* | 4/2013 | Kountotsis | G07G 1/0036 705/23 |
| 2013/0149687 A1* | 6/2013 | Argott | 434/351 |
| 2013/0177879 A1* | 7/2013 | Lipsky et al. | 434/167 |
| 2013/0219172 A1* | 8/2013 | Johnson et al. | 713/153 |
| 2013/0295547 A1* | 11/2013 | Silver | 434/362 |
| 2013/0302774 A1* | 11/2013 | King et al. | 434/351 |
| 2014/0281545 A1* | 9/2014 | Erofeev et al. | 713/171 |

OTHER PUBLICATIONS

Summit Global Testing, "Summit Revamps The GMAT Testing Engine for the Princeton Review", 3 pages, May 8, 2012.
Software Secure, http://softwaresecure.com, 6 pages, downloaded Feb. 5, 2013.
International Search Report and Written Opinion dated Jul. 30, 2014 in counterpart International Application No. PCT/US13/75346.
Chinese Patent Application No. 201380073332.6, First Office Action dated May 15, 2017, 16 pages.

\* cited by examiner

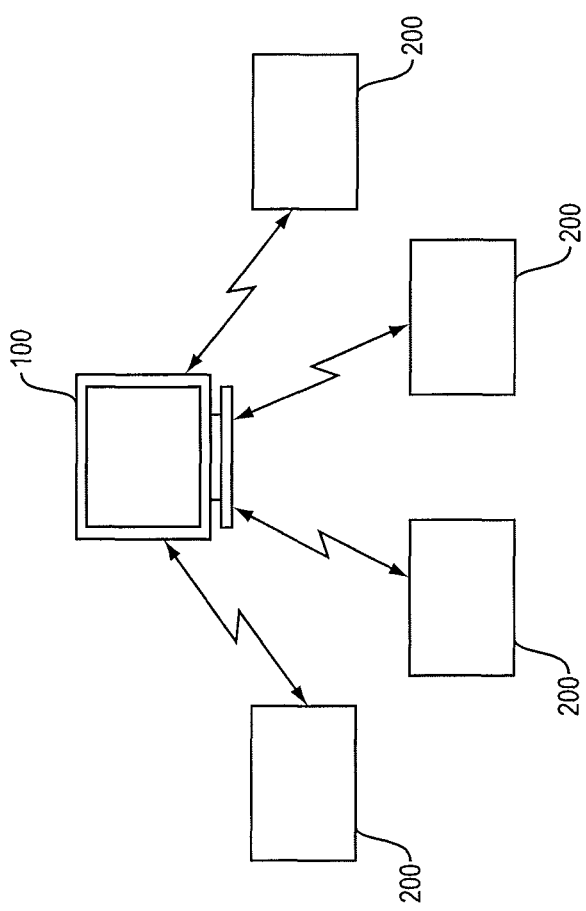

| Reference # | Image |
|---|---|
| 721 | A university library budget committee must reduce exactly five of eight areas of expenditure — G, L, M, N, P, R, S, and W — in accordance with the following conditions:<br><br>If both G and S are reduced, W is also reduced.<br>If N is reduced, neither R nor S is reduced.<br>If P is reduced, L is not reduced.<br>Of the three areas L, M, and R, exactly two are reduced. |
| 5940 | If both M and R are reduced, which one of the following is a pair of areas neither of which could be reduced? |
| 5998 | G, L |
| 6523 | G, N |
| 6790 | L, N |
| 9009 | L, P |
| 9571 | P, S |

FIG. 2B

SYSTEM AND METHOD FOR ELECTRONIC TEST DELIVERY

FIELD OF THE INVENTION

The invention generally relates to systems and methods for electronic test delivery.

SUMMARY OF EMBODIMENTS OF THE INVENTION

The present invention is directed to systems and methods for electronic test delivery. One embodiment includes a host computer and one or more devices in electronic communication with the host computer over a wireless private network. The host computer is configured to transmit data describing a plurality of test unit components to at least one of the devices. Each of the devices is configured to request from the host computer certain of the data describing the plurality of test unit components that form a test unit, receive the certain data, assemble the certain data, and display the assembled certain data as the test unit. The host computer is further configured to receive data describing one or more responses associated with the test unit from at least one of the devices.

In some embodiments, the test unit includes a plurality of test questions and a plurality of possible answers to each of the plurality of test questions. In other embodiments, the test unit comprises a single test question and plurality of possible answers to the single test question.

In certain embodiments, each of the devices is further configured to store data describing only one test unit at a time and only until data describing a response to the test unit is sent to the host computer. In some embodiments, the test unit comprises at least one question and the response comprises an answer to the at least one question. In some embodiments, the response comprises a request for another test unit.

In some embodiments, each of the one or more devices is further configured to communicate only with the host computer and receive input from an end user.

In some embodiments, the host computer is further configured to communicate with each of the devices independently.

In some embodiments, each of the devices is configured to store data received from the host computer only in RAM memory.

In further embodiments, in addition to receiving the requested certain data, the devices receive data unrelated to the test unit.

A further inventive embodiment includes a host computer, one or more devices in electronic communication with the host computer over a wireless private network; and a scanning device in electronic communication with the host computer. In this embodiment, the host computer is configured to transmit data describing a test unit to at least one of the devices and to receive data describing one or more responses associated with the test unit from at least one of the devices. The scanning device is configured (i) to scan an image printed on a medium associated with an end user; (ii) for each of the one or more devices, to scan an image displayed on the device; and (iii) to transmit to the host computer first data associated with the image printed on the medium and second data associated with the image displayed on the device. The host computer is further configured to associate the end user with the device based on the first data and the second data.

In certain embodiments, the host computer is further configured to verify software on the device based on the second data. In other embodiments, the host computer is further configured to verify battery life the device based on the second data. In still other embodiments, the host computer is further configured to authorize the device to communicate with the host computer over the wireless private network based on the second data.

BRIEF DESCRIPTION OF THE DRAWINGS

The foregoing summary, as well as the following detailed description of various embodiments, will be better understood when read in conjunction with the appended drawings. It should be understood, however, that the invention is not limited to the precise arrangements and instrumentalities shown.

In the drawings:

FIG. 1 is a diagram illustrating an embodiment of a system of the present invention;

FIG. 2B illustrates how components of a test unit may be associated with a reference number;

DETAILED DESCRIPTION

The present invention is directed to systems and methods for electronic test delivery. Generally, the system includes a host computer and one or more devices connected to the host computer within a testing room via a wireless personal network. In one embodiment, to ensure wireless coverage of the devices is evenly distributed within the testing room, the devices are wireless connected to one another within a peer-to-peer configuration. The breakdown, disappearance, or power loss of any single device will not adversely impact the proper administration of the test and collection of examination data. The host computer stores all the data that comprises the test, delivers test unit data to the devices and receives responses as they are provided by an end user using a device, as described in more detail below.

In one embodiment, the device only receives one test unit at a time from the host computer. The test unit can be a passage, one or more questions associated with the passage, and proposed responses to each question. The test unit can also be multiple passages, each passage having one or more questions associated with the passage, and proposed responses to each question. Further, the text unit may simply be one or more questions, with proposed responses to each question. An end user may respond to a question by selecting one of the proposed responses or may respond to a question by requesting that a different test unit be sent from the host computer. The different test unit may be one previously viewed by the end user or one not yet viewed.

FIG. 1 illustrates an exemplary embodiment in which a host computer 100 is in electronic communication with one or more devices 200 over a wireless private network. While in the illustrated example four devices 200 are shown, this number is exemplary and for illustrative purposes only. The host computer 100 may be connected to only one device 200 within a testing location, or may be connected to many devices 200, limited by practical considerations of the testing environment or any processing or storage limitations of the host computer 100. In the exemplary embodiment, the host computer 100 hosts the test session. The host computer 100 may be a personal computer or lap top or other computing device including one or more processors, memory, software stored thereon, redundant power supplies, disk drives and other fault tolerant features as will be known to those skilled in the art.

Disk drives are encrypted at the hardware level, in one embodiment. Thus, for example, the disk encryption would have the date (or some other measure of time) as part of the determination of its decrypt key. In this example, the key would change over time and any given key would only work during a given time period. In a specific example, if the encryption is daily and resets at midnight, the key that would unlock the encryption today will not work tomorrow nor would it have worked yesterday. Today's encryption key would be needed.

Figure 2A:
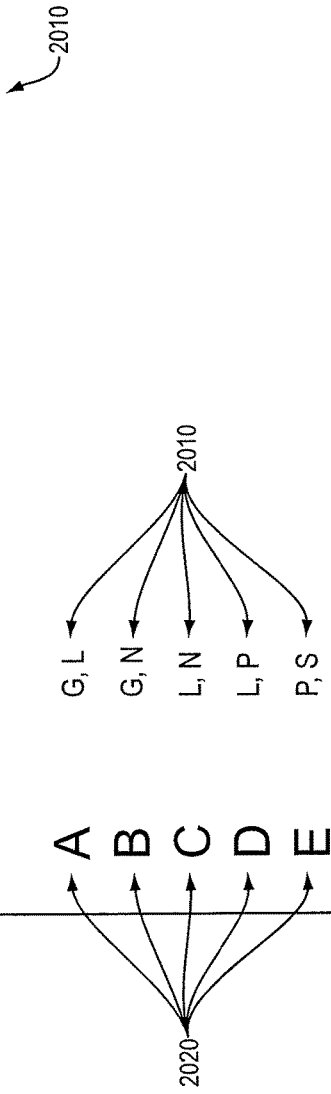
FIG. 2A illustrates how a test unit may be broken down into components, in an exemplary embodiment.

In one embodiment, the host computer stores the test unit data in components. For example, the host computer may store a passage as one component, each question associated with each passage as separate component and each possible response to each question as a separate component. FIG. 2A is illustrative of test unit components.

Still further, in some embodiments, the test unit data (e.g., each component for those embodiments in which the test unit data is stored as components) is stored in a bit map or other image format, rather than as text, as indicated in FIG. 2A (see images 2010). The images are transmitted to each device 200 and served up graphically. Various headings 2020 relating to the test unit (e.g., Passage for Question 1, Question 1, Potential Answers A, B, C, D and E) may be part of the user interface stored on devices 200.

Still further, in some embodiments, each item of data that comprises the test unit (e.g., each item of image data) is associated with a randomly generated reference number, as illustrated in FIG. 2B. In these embodiments, the host computer 100 stores the data comprising the test unit, and the reference number for each item of test unit data, but not the information required to determine which items of data are associated to form a test unit. In such embodiments, the logic necessary to make this determination is stored on each device 200. One example of how this may be achieved is described more fully below.

By way of background, most random number generators in computer languages allow the input of a "seed" number and, thus, are technically Pseudorandom Number Generators. Each time the same seed number is used, the random number generator will generate the same "random" numbers. This feature is very useful in testing as the exact conditions of a failure can be reproduced by using the old seed.

For example: if RND(5), wherein "5" is the seed, produces the sequence of pseudorandom numbers, 3289, 542, 128, 8543, 7895 then anytime "5" is used as a seed the results will be 3289, 542, 128, 8543, 7895. If any other number is used, as the seed the results will be entirely different. For instance, RND(6) might be 7832, 5643, 12, 456, 4569.

Using these pseudo random numbers, one number can be used to represent a string of numbers. For instance, if a sending computer wants to send to a recipient computer the numbers "3289, 542, 128, 8543, 7895", if the sending computer knows that the recipient computer has the same pseudorandom number generator, then instead of sending the recipient computer the string of numbers, the sending computer can just send the recipient computer the number "5". The recipient computer can then plug "5" into its pseudorandom number generator to determine the string of numbers sought to be communicated.

Furthermore, if the communication was intercepted, the intercepting device would not know the string of numbers; all it would know is the number "5". To know the string of numbers, the intercepting device would need to know 1) the seed, in this case "5", 2) the algorithm used by the pseudorandom number generator, and 3) the length of string of number (if not all numbers in the string are used, they might also need to know which is the first valid number).

In the described embodiment, the pseudorandom number generator that uses these seeds would be maintained only on the device(s) 200, and not on the host computer 100.

Thus, an example of how this can be used in connection with the exemplary embodiment is described as follows:

Test item:
Passage: X+2=Y
Question: If Y is equal to 4 what is the value of X?
Response 1: 1
Response 2: 2
Response 3: 3
Response 4: 3.1415
Response 5: All of the above The test item would be associated with a seed number and each part of the test item would be assigned an index resulting from the seed. Assuming for this example the seed 11 and the first 7 numbers generated are 12, 2, 7, 5, 18, 8, 3. Then, the index numbers would be assigned as follows:

| Index# 12 | Passage: X + 2 = Y |
| Index# 2 | Question: If Y is equal to 4 what is the value of X? |
| Index# 7 | Response 1: 1 |
| Index# 5 | Response 2: 2 |
| Index# 18 | Response 3: 3 |
| Index# 8 | Response 4: 3.1415 |
| Index# 3 | Response 5: All of the above |

At testing time, when a device 200 employed by a test taker requests a new question from the host computer 100, the device 200 will send the host computer 100 an indication of which number question in the section they want. The host computer 100, knowing what section the candidate is on, finds the question and sends the seed value back to the device 200.

The device 200 then uses the seed value to send the string "12,2,7,5,18,8,3" to the host computer 100 which then sends back to the device 200 the text associated with those indexes. The combined text represents the test item which the device 200 then displays on the screen.

This method allows for obfuscation of the relation of parts of test items to each other in the event an intercepting device were able to break the encryption. The following is illustrative of the advantages achieved using this method:

Example of a typical implementation:

| A2SLR | 1 | Question | If Y is equal to 4 what is the value of X? |
| A2SLR | 1 | Passage | X + 2 = Y |
| A2SLR | 1 | E | All of the Above |
| A2SLR | 1 | D | 3.1415 |
| A2SLR | 1 | C | 3 |
| A2SLR | 1 | B | 2 |
| A2SLR | 1 | A | 1 |
| A2SLR | 2 | Question | If Z is 36 and Y is 25 then what is X |
| A2SLR | 2 | Passage | $X^2 + Y^2 = Z$ |
| A2SLR | 2 | E | 2 |

-continued

| | | | |
|---|---|---|---|
| A2SLR | 2 | D | 3 |
| A2SLR | 2 | C | square root of 11 |
| A2SLR | 2 | B | square root of 25 |
| A2SLR | 2 | A | 1 |

In the traditional implementation, it is easy to determine the questions.

Example of the implementation described herein:

| 1 | 2 |
|---|---|
| 2 | If Y is equal to 4 what is the value of X? |
| 3 | All of the Above |
| 4 | square root of 25 |
| 5 | 2 |
| 6 | If Z is 36 and Y is 25 then what is X |
| 7 | 1 |
| 8 | 3.1415 |
| 9 | 1 |
| 11 | square root of 11 |
| 12 | X + 2 = Y |
| 15 | X^2 + Y^2 = Z |
| 16 | 3 |
| 18 | 3 |

A second table would be employed, for example, as follows:

| Form # | Question # | Seed |
|---|---|---|
| A2SLR | 1 | 11 |
| A2SLR | 2 | 43 |

With hundreds of questions stored this way, it would be extraordinarily difficult to determine which questions, responses and prompts go together.

Furthermore, since the random generation of numbers will leave gaps, those gaps can be filled with numbers in similar form to the actual items. For example, these gaps could be filled with material from disclosed tests or text purposefully written to mimic questions on the tests being given.

For example, filling in the gaps above might result in the following:

| 1 | 2 |
|---|---|
| 2 | If Y is equal to 4 what is the value of X? |
| 3 | All of the Above |
| 4 | square root of 25 |
| 5 | 2 |
| 6 | If Z is 36 and Y is 25 then what is X |
| 7 | 1 |
| 8 | 3.1415 |
| 9 | 1 |
| 10 | Smith |
| 11 | square root of 11 |
| 12 | X + 2 = Y |
| 13 | Thermos |
| 14 | Y^2 = 46 |
| 15 | X^2 + Y^2 = Z |
| 16 | 3 |
| 17 | X + Y = X |
| 18 | 3 |
| 19 | 8 |
| 20 | Why is the sky blue? |

Devices 200 include one or more processors, memory and software stored thereon. Devices 200 are specially configured, in some embodiments, to display a user interface, receive end user input, and communicate data only to and from the host computer 100. For example, when the device 200 is identified (e.g., scanned as described more fully below), the host computer 100 sends out a sign with Media Access Control (MAC) ID of the device 200. The device 200 notes this signal and makes a connection to the network. The host computer 100 then ensures that the MAC address if valid and the device 200 sends another identifier (i.e., to prevent spoofing). The device 200 is programmed only to accept traffic from the host computer 100. In some embodiments, the devices 200 store only one test unit at a time (i.e., the test unit being displayed to the end user) and only until the end user has indicated an intent to receive another test unit (e.g., either by answering the question(s) in the test unit or by requesting a new test unit). Further, in some embodiments, test unit data is stored only in RAM of the device, which is reserved for question storage. Once the end user has indicated an intent to receive another test unit, the data in the RAM reserved for question storage will be overwritten. In one embodiment, after a certain amount of time has elapsed (e.g., 45 minutes), all data in the RAM reserved for question storage will be overwritten with default data (e.g., all 1s).

Software updates to devices 200 may be made wirelessly or otherwise uploaded from storage media.

In some embodiments, the host computer 100 is configured to communicate with each of the devices 200 independently (i.e., not all at the same time). Thus, when devices 200 connect with the host computer 100, the host computer 100 will establish memory space for each device 200 for storing data specific to that device including data indicating the state of the device 200 (e.g., which sections and questions the device has covered).

Each of the devices 200 is configured to request from the host computer 100 certain of the data describing the plurality of test unit components that form a test unit. In particular, the device 200 includes the programming logic to know which data to ask for from the host computer 100, an example of which is described in more detail above.

In response to the request, the host computer 100 transmits data describing a plurality of test unit components to each requesting device 200. The device 200 then receives the data, assembles it, and displays the assembled data as the test unit.

The user may then indicate a response to the test unit using the device 200. The response may be a request for another test unit or an answer to a question comprising or within the test unit. The response is then received by the host computer 100 and stored.

Figure 3A:
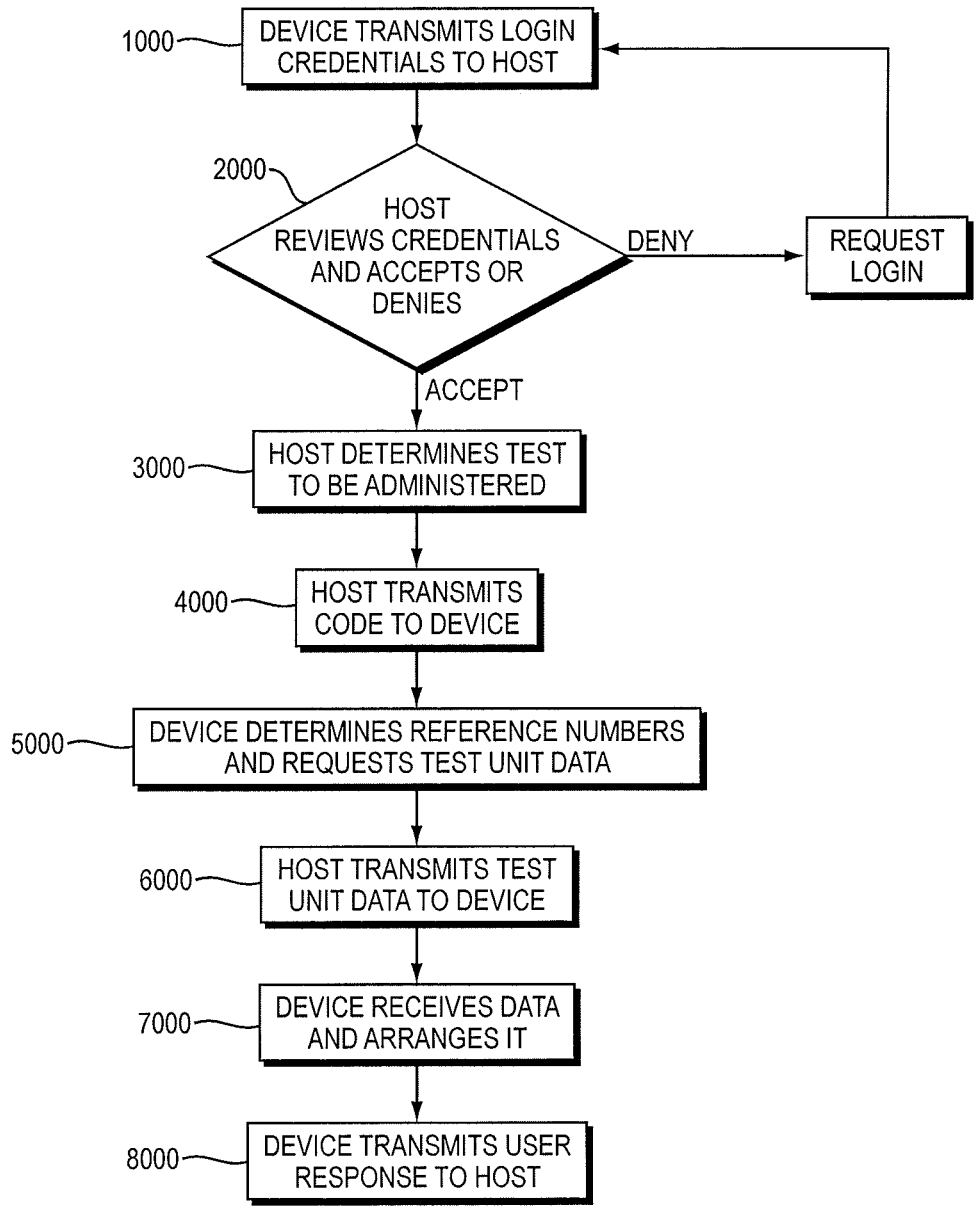
FIG. 3A is a flow diagram illustrating an embodiment of a method of the present invention.

With reference to FIG. 3A, a flow diagram illustrating an exemplary method of the present invention is shown. In step 1000, a device 200 transmits its log in credentials to the host computer 100 and, in step 2000, the host computer 100 reviews the credentials and either accepts or denies log in. This can be accomplished in a traditional manner, e.g., in which an end user inputs into the device 200 a user name and password. However, alternative log in methods can be used within the scope of the present invention, such as those described below. Assuming the credentials are accepted, in step 3000, the host computer 100 determines the test unit to be administered. In step 4000, the host computer 100 transmits the seed code to the device 200. Based on the seed code, the device 200 determines the reference numbers of the test unit data (e.g., test unit components) it requires and, in step 5000, makes a request to the host computer 100 for the test unit data associated with the determined reference numbers. In step 6000, the host computer 100 transmits the requested test unit data to the device 200. In some embodiments, data not related to the test unit, and perhaps not requested by the device 200, is also sent along with the data specifically requested (referred to as extraneous data). In step 7000, the device 200 receives the data and arranges it on the screen of the device. If the data is in image format, the arrangement may be made according to the size of image and question type. In step 8000, upon receiving a response from the end user (e.g., a selected answer or a request for another test unit), the device 200 transmits data representing the response to the host computer. In some embodiments, the device 200 may also send data indicating a time stamp.

Figure 4:
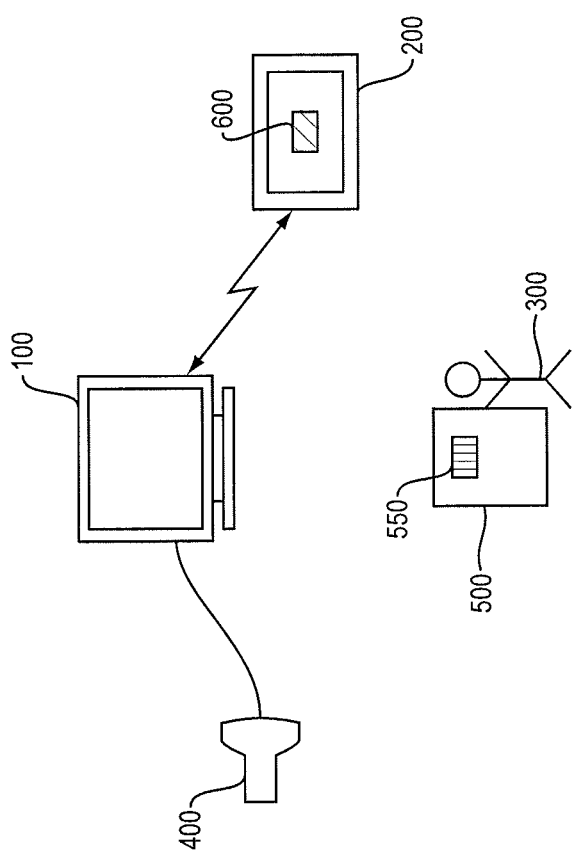
FIG. 4 is diagram illustrating an embodiment of a system of the present invention

With reference to FIG. 4, a further exemplary embodiment is shown and described. This system includes host computer 100; one or more devices 200 in electronic communication with the host computer 100 over a wireless private network; and a scanning device 400 in electronic communication with the host computer 100. The connections between the host computer 100 and the scanning device 400 may be wired or wireless. In this embodiment, the host computer 100 is configured to transmit data describing a test unit to the device(s) 200 and to receive data describing one or more responses associated with the test unit from the device(s) 200.

In an electronic testing environment, as in the example described above with reference to FIG. 4, it becomes necessary to associate the identity of a particular end user 300 with the device 200 employed by that end user 300 to take the test. In the exemplary embodiment, the end user 300 has a ticket or other medium 500 on which an image 550 is printed. The image 550 may be a two dimensional bar code or other computer readable code representing data that identifies and/or describes the end user 300, such as, e.g., the end user's name, an identifier associated with the end user, gender information and/or date of birth. When the device 200 is booted up, the device 200 displays an image 600. Image 600 may be a two dimensional bar code or other computer readable code representing data that identifies the device 200. In some embodiments the image 600 is used to verify that the device 200 is operational, verify that the correct version of the client software is on the device 200; verify that battery life remaining on the device 200 is within the expected range; and allow the host computer 100 to verify the device 200 is a valid test recipient.

In one embodiment, the image 600 can be a 2D bar code in QR Format, as described in U.S. Pat. No. 5,726,435, and employ the following standards:
 1. Symbol Version 10 (57×57)
 2. Level H error Correction (high)
 3. Encoding mode—0010 (alpha numeric)
 4. Module size 2.0 mm2
 5. Securing margin—10 mm It will be understood by those skilled in the art that other coded images, using alternative formats, can be used in connection with the present invention.

The image 600 may include the following information:
 1. Current date and time—from the clock on device 200
 2. Version of the software on device 200—encoded into every release version
 3. Operating System Version—for example, assuming an Android operating system on device 200, from the Android API "android.os.Build.VERSION.SDK_INT"
 4. Battery life—e.g., from Android SDK ACTION_BATTERY_CHANGED
 5. Wifi MAC address—e.g., from Android WiFi Manager call wifiIng.getMacAddress In some embodiments, the MAC address may either be encrypted or, alternatively, a field generated from the MAC address using a proprietary algorithm may be added. This would ensure that a fake bar code could not be used without breaking the encryption or, in the alternative embodiment, knowing the algorithm. In some embodiments, the entire bar code is not encrypted, as it may be useful to have the unencrypted information available when servicing the devices 200 to verify battery life and version updates.

Referring back now to FIG. 4, the scanning device 400 is configured to scan the image 550 printed on the medium 500 associated with the end user 300 and to scan the image 600 displayed on the device 200. Scanning device 400 transmits to the host computer 100 first data associated with the image 550 printed on the medium 500 and second data associated with the image 600 displayed on the device 200.

The host computer 100 then logs the end user 300 onto the particular device 200, by storing an association between the first data and the second data in memory of the host computer 100.

In still other embodiments, the host computer 100 is further configured to authorize the device 200 to communicate with the host computer 100 over the wireless private network based on the second data. Thus, the host computer 100 would recognize the MAC address of the device 200 as a valid receiver. This could be accomplished, for example, by adding the MAC address to the router's table of valid MAC addresses. In addition, the host computer 100 may compare the information from the ticket 500 to the roster of test takers at the test center to ensure the test taker is on the roster.

This embodiment provides several advantages in the electronic test taking environment. First, it avoids the logistical problems associated with end users having to remember and input user names and passwords. Further, it enhances security by adding to the router's list of allowable MAC addresses (i.e., devices 200 with MAC addresses that are permitted to get through the firewall if host computer 100) only those devices that are scanned. Still further, it automates checks of the devices 200 for low battery power or incorrect software versioning.

Figure 3B:
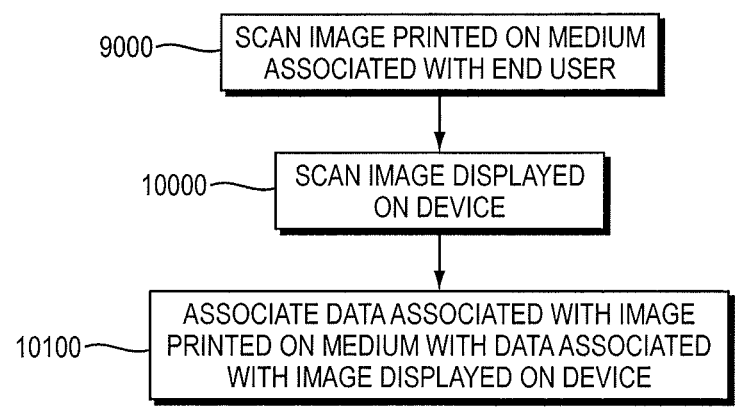
FIG. 3B is a flow diagram illustrating an embodiment of a method of the present invention.

With reference to FIG. 3B, a flow diagram illustrating a further embodiment of the invention is illustrated. In step 9000, an image printed on a medium associated with an end user is scanned using a scanning device. In step 10000, for each of one or more devices, an image displayed on the device is scanned using the scanning device. In step 10100, first data associated with the image printed on the medium and second data associated with the image displayed on the device is transmitted to the host computer. In step 10200, the end user is associated with the device, by the host computer, based on the first data and the second data.

What is claimed is:
1. A system comprising:
  a host computer comprising a memory and a processor;
  wherein the host computer is configured to
    store and transmit data describing a plurality of test unit components to at least one of the devices,
      wherein the plurality of test unit components comprise at least one test question and at least two possible answers to the at least one test question; and
    wherein the host computer is configured to associate each test component with a reference number;
      wherein each reference number corresponds to a discrete index location in the memory of the host computer, and wherein the reference number is generated via pseudorandom-number generator and a seed code associated with each test unit;

wherein the pseudorandom-number generator is not stored on the host computer;

one or more devices in electronic communication with the host computer over a wireless private network, wherein each of the one of more devices stores the pseudorandom-number generator; and wherein each of the one or more devices is configured to:

(i) send to the host computer an indication of a test unit sought by the device;

(ii) receive from the host computer the seed code associated with the test unit sought by the device;

(iii) request from the host computer data describing a plurality of test unit components that form the test unit sought by the device, wherein the device uses the seed code and pseudorandom-number generator to identify which test unit components form the test unit sought by the device, (iv) receive the requested test unit components, (v) assemble the received test unit components into the test unit based an order determined by the pseudorandom-number generator, and (vi) display the assembled test unit components as the test unit via the device;

and wherein the host computer is further configured to receive data describing one or more responses associated with the test unit from at least one of the devices.

2. The system of claim 1, wherein the test unit comprises a plurality of test questions and a plurality of possible answers to each of the plurality of test questions.

3. The system of claim 1, wherein the test unit is a single test question and plurality of possible answers to the single test question.

4. The system of claim 3, wherein each of the devices is further configured to store data describing only one test unit at a time and only until data describing a response to the test unit is sent to the host computer.

5. The system of claim 1 wherein each of the one or more devices is further configured to communicate only with the host computer and receive input from an end user.

6. The system of claim 1 wherein the host computer is further configured to communicate with each of the devices independently.

7. The system of claim 1 wherein each of the devices is configured to store data received from the host computer only in RAM memory.

8. The system of claim 1 wherein, in addition to receiving the requested test unit components, the devices receive data unrelated to the test unit.

9. The system of claim 4, wherein the response comprises a request for another test unit.

10. The system of claim 4, wherein the test unit comprises at least one question and wherein the response comprises an answer to the at least one question.

11. A method comprising:

storing by a host computer data describing a plurality of test unit components, wherein the plurality of test unit components comprise at least one test question and at least two possible answers to the at least one test question;

wherein each of the plurality of test unit components is associated with a reference number; wherein each reference number corresponds to a discrete index location in the memory of the host computer; wherein the reference number is generated via pseudorandom-number generator and a seed code associated with each test unit; and wherein the pseudorandom-number generator is not stored on the host computer;

receiving by the host computer an indication of a test unit sought by a device, the device being in electronic communication with the host computer over a wireless private network; and wherein the device stores the pseudorandom-number generator;

transmitting by the host computer to the device the seed code associated with the test unit sought by the device;

receiving by the host computer a request from the device of data describing a plurality of test unit components that form the test unit sought by the device, wherein the device uses the seed code and pseudorandom-number generator to identify which test unit components form the test unit sought by the device;

transmitting by the host computer to the device the requested test unit components, wherein the device (i) assembles the test unit components transmitted by the host computer into the test unit based an order determined by the pseudorandom-number generator, and (ii) displays the assembled test unit components to form the test unit via the device;

and receiving by the host computer data describing one or more responses associated with the test unit from the device.

12. The method of claim 11, wherein the test unit comprises a plurality of test questions and a plurality of possible answers to each of the plurality of test questions.

13. The method of claim 11, wherein the test unit is a single test question and plurality of possible answers to the single test question.

14. The method of claim 13, wherein the device is configured to store data describing only one test unit at a time and only until data describing a response to the test unit is sent to the host computer.

15. The method of claim 11 wherein the device is further configured to communicate only with the host computer and receive input from an end user.

16. The method of claim 11 wherein the host computer is configured to communicate with each of a plurality of devices independently.

17. The method of claim 11 wherein the device is configured to store data received from the host computer only in RAM memory.

18. The method of claim 11 wherein, in addition to receiving the requested test unit components, the device receives data unrelated to the test unit.

19. The method of claim 14, wherein the response comprises a request for another test unit.

20. The method of claim 14, wherein the test unit comprises at least one question and wherein the response comprises an answer to the at least one question.

* * * * *